United States Patent
Yeh et al.

(10) Patent No.: US 8,964,129 B2
(45) Date of Patent: Feb. 24, 2015

(54) LIGHT ENGINE AND REAR PROJECTION TELEVISION

(71) Applicant: Hon Hai Precision Industry Co., Ltd., New Taipei (TW)

(72) Inventors: Wen-Pin Yeh, New Taipei (TW); Tsung-Je Chiu, New Taipei (TW); Kai Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/927,393

(22) Filed: Jun. 26, 2013

(65) Prior Publication Data
US 2014/0204280 A1   Jul. 24, 2014

(30) Foreign Application Priority Data
Jan. 22, 2013   (TW) .............................. 102102283 A

(51) Int. Cl.
*H04N 9/31*   (2006.01)
*F21V 13/04*   (2006.01)

(52) U.S. Cl.
CPC . *H04N 9/31* (2013.01); *F21V 13/04* (2013.01)
USPC ...................................................... 348/759

(58) Field of Classification Search
USPC ................ 348/744, 759–761; 349/74, 77, 83; 359/316, 318; 353/31, 99
See application file for complete search history.

(56) References Cited

U.S. PATENT DOCUMENTS

| | | | | |
|---|---|---|---|---|
| 5,692,819 | A * | 12/1997 | Mitsutake et al. | 353/31 |
| 5,990,990 | A * | 11/1999 | Crabtree | 349/74 |
| 6,155,688 | A * | 12/2000 | Anderson et al. | 353/99 |
| 6,639,631 | B1 * | 10/2003 | Hall et al. | 348/744 |
| 6,795,182 | B2 * | 9/2004 | Rakuljic et al. | 356/328 |
| 7,682,027 | B2 * | 3/2010 | Buczek et al. | 351/221 |
| 8,277,048 | B2 * | 10/2012 | Artsyukhovich et al. | 351/221 |
| 8,292,434 | B2 * | 10/2012 | Horvath et al. | 351/221 |
| 8,348,430 | B2 * | 1/2013 | Artsyukhovich | 351/221 |
| 2010/0177280 | A1 * | 7/2010 | Buczek et al. | 351/221 |
| 2011/0037948 | A1 * | 2/2011 | Horvath et al. | 351/221 |
| 2012/0050623 | A1 | 3/2012 | Haraguchi et al. | |
| 2012/0206050 | A1 * | 8/2012 | Spero | 315/152 |

* cited by examiner

*Primary Examiner* — Paulos M Natnael
(74) *Attorney, Agent, or Firm* — Novak Druce Connolly Bove + Quigg LLP

(57) ABSTRACT

A light engine includes a light source module, an optical assembly, a collimating lens, and a reflecting lens. The optical assembly includes a light inlet and a light outlet communicating with the light inlet. The light source module is connected to the light inlet. The collimating lens is connected to the light outlet. The reflecting lens includes a concave surface, and the concave surface faces the collimating lens.

10 Claims, 3 Drawing Sheets

LIGHT ENGINE AND REAR PROJECTION TELEVISION

BACKGROUND

1. Technical Field

The present disclosure relates to rear projection televisions and, particularly, to a light engine for a rear projection television and the rear projection television using the light engine.

2. Description of Related Art

Rear projection televisions generally include a light engine, a reflecting mirror, and a display. Light rays emitting from the light engine project onto the reflecting mirror. The reflecting mirror reflects the light rays to the display. The light engine includes a telecentric lens to decrease distortion of images. However, the telecentric lens generally needs a longer projection distance to project the light rays, which necessarily increases the size of the light engine and the rear projection televisions.

Therefore, it is desirable to provide a light engine and a rear projection television, which can overcome the limitations described.

DETAILED DESCRIPTION

Embodiments of the disclosure will be described with reference to the drawings.

Figure 1:
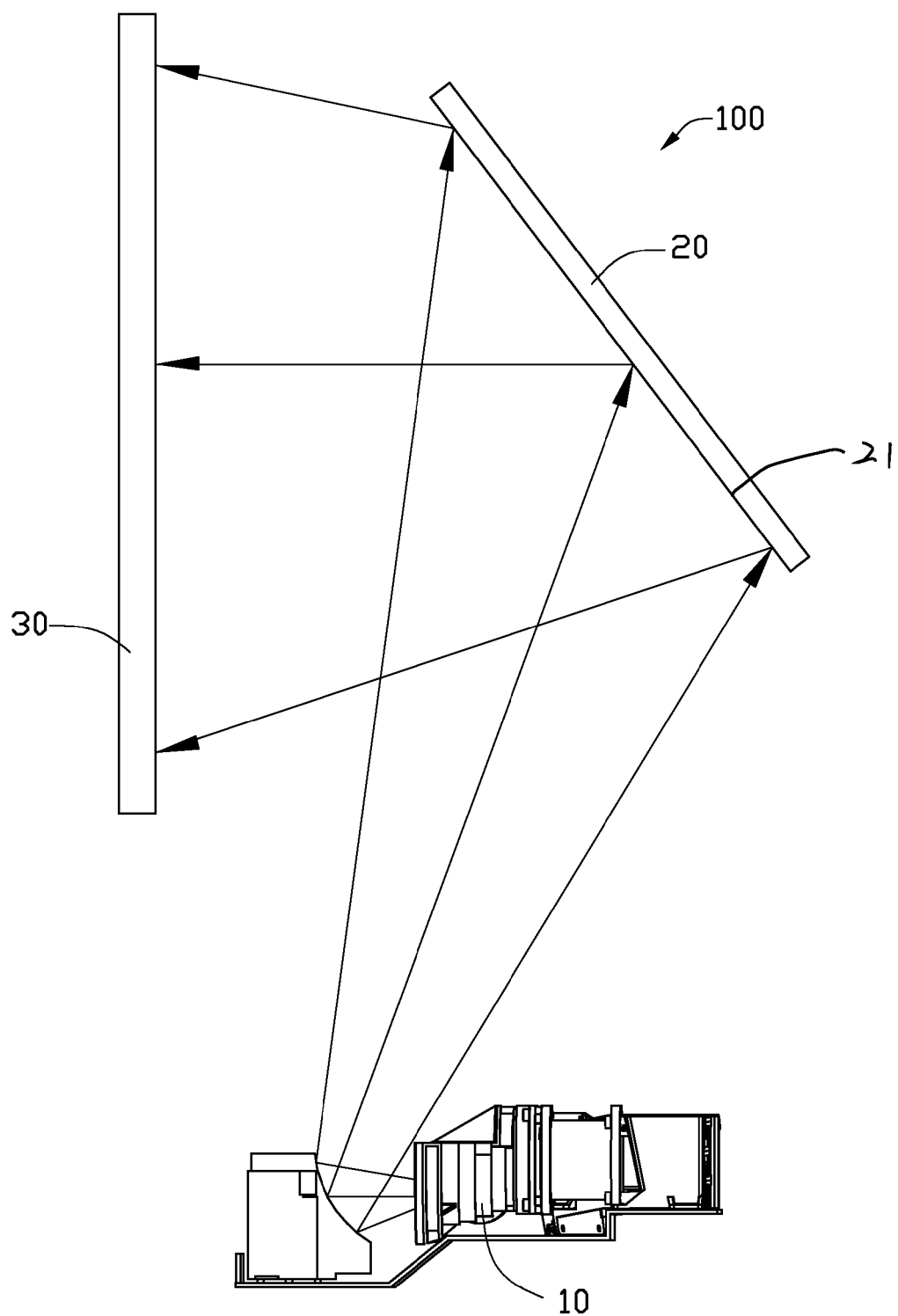
FIG. 1 is a schematic view of a rear projection television in accordance with an exemplary embodiment.
Figure 2:
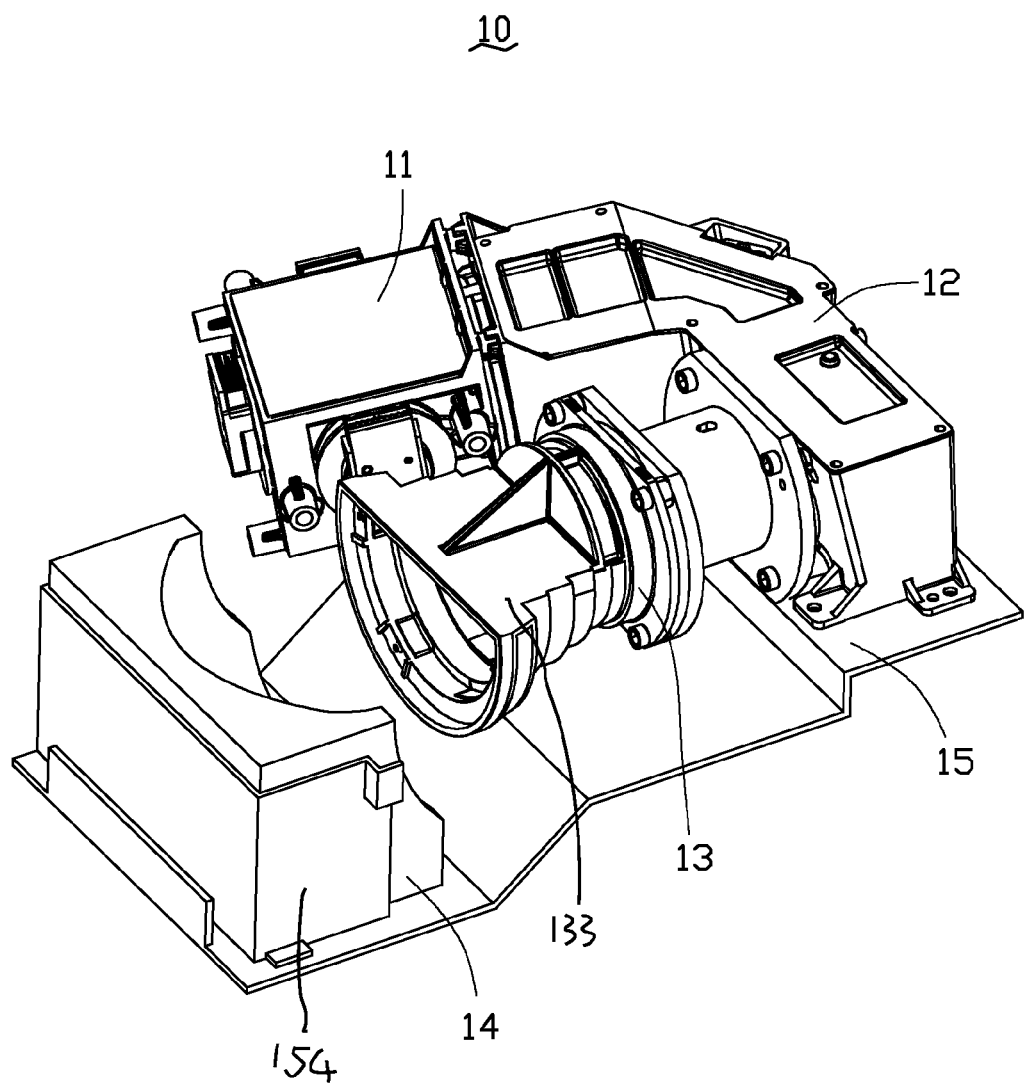
FIG. 2 is an isometric view of a light engine of the rear projection television of FIG. 1.
Figure 3:
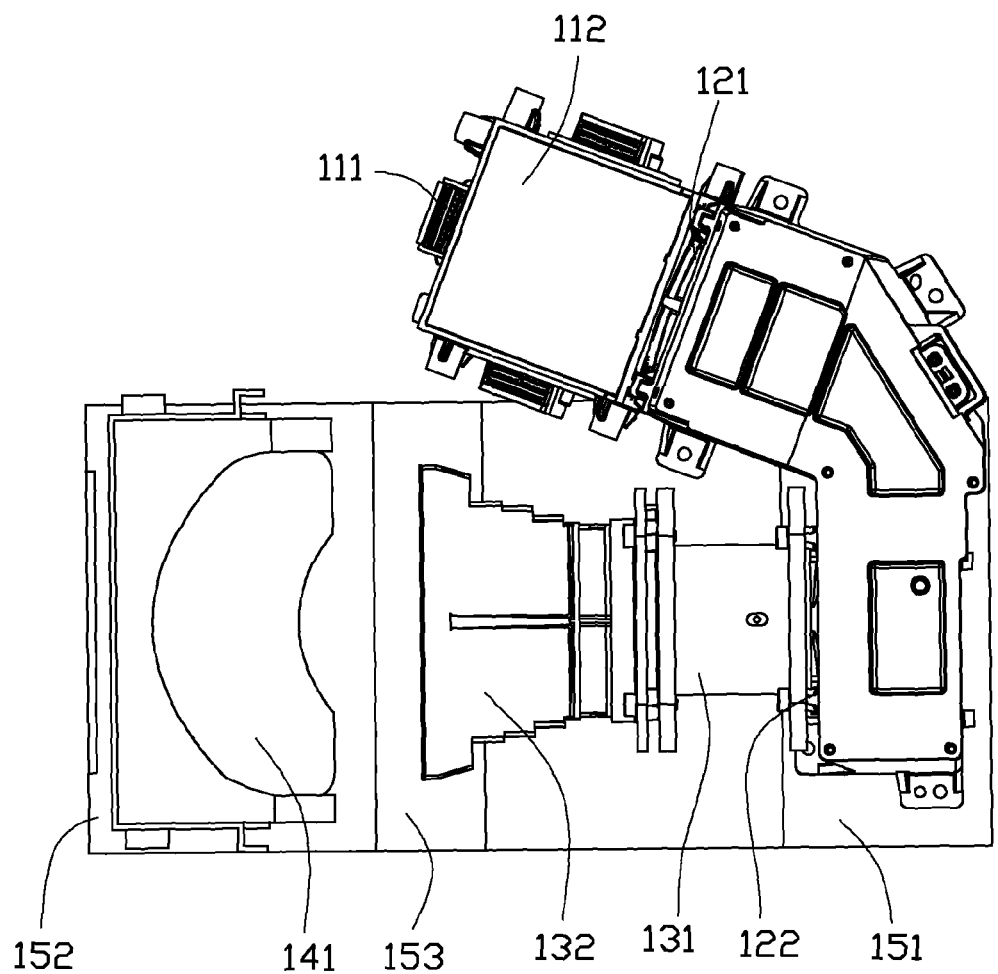
FIG. 3 is a schematic view of the light engine of FIG. 2.

FIGS. 1-3 show a rear projection television 100 according to an exemplary embodiment. The rear projection television 100 includes a light engine 10, a reflecting mirror 20, and a display 30.

The light engine 10 emits light rays to the reflecting mirror 20, and includes a light source module 11, an optical assembly 12, a collimating lens 13, a reflecting lens 14, and a supporting plate 15.

The light source module 11 includes three light emitting diodes (LEDs) 111 and an X-prism 112. The X-prism 112 is a cuboid and includes four side surfaces 1121. The three LEDs 111 are attached on three of the four side surfaces 1121. In the embodiment, the three LEDs 111 respectively emit red, green, and blue lights. The red, green, and blue lights emitted from the LEDs 111 are combined by the X-prism 112, and the combined light is emitted through or from the other side surface 1121 which does not carry any LED 111.

The optical assembly 12 is L-shaped, and includes a light inlet 121 and a light outlet 122 communicating with the light inlet 121. The light inlet 121 and the light outlet 122 point substantially in the same direction. The optical assembly 12 includes a number of optical elements (not shown) and a digital mirror device (not shown). The combined light rays enter into the optical assembly 12 via the light inlet 121 and exit from the light outlet 122 after being processed by the optical elements and the digital mirror device.

The collimating lens 13 has a short focal length less than about 35 mm. The collimating lens 13 includes a rear end 131 and a front end 132. As the light rays emitted from the collimating lens 13 just penetrate a lower part of the front end 132, an upper part of the front end 132 is cut to form a substantially flat top surface 133, so as to decrease the size of the collimating lens 13.

The reflecting lens 14 includes a concave surface 141. The light rays projected on the concave surface 141 are wholly reflected. In the embodiment, the concave surface 141 is a spherical-shaped surface. In order to improve reflectance of the concave surface 141, a reflecting film (not shown) is coated on the concave surface 141. The design of the concave surface 141 decreases distortion of the light rays projected thereon.

The supporting plate 15 includes a first plate 151, a second plate 152, a connection plate 153, and a position plate 154. The first plate 151 is generally parallel with the second plate 152. The connection plate 153 connects between the first plate 151 and the second plate 152. The height of the second plate 152 is less than the height of the first plate 151. The position plate 154 is positioned on the second plate 152.

During assembling, the light source module 11 is connected to the light inlet 121 of the optical assembly 12. The side surface 1121 without an LED 111 attached faces the light inlet 121. The rear end 131 of the collimating lens 13 is connected to the light outlet 122 of the optical assembly 12. The optical assembly 12 and the collimating lens 13 are supported on the first plate 151. The reflecting lens 14 is supported on the second plate 152, and is fixed by the position plate 154. The concave surface 141 faces the front end 132 of the collimating lens 13.

The reflecting mirror 20 is a flat plate, and includes a reflecting surface 21. The concave surface 141 faces the reflecting surface 21. The light rays projected on the reflecting surface 21 are wholly reflected onto the reflecting mirror 20.

The display 30 is flat, and faces the reflecting mirror 20. The display 30 and the reflecting mirror 20 form an acute angle facing the light engine 10. In the embodiment, the display 30 is a liquid crystal display.

In use, the light rays combined by the light source module 11 are projected into the optical assembly 12 from the light inlet 121. The light rays are reflected to the collimating lens 13 after penetrating the optical assembly 12. The light rays are projected from the front end 132 and fall on the concave surface 141. The concave surface 141 reflects the light rays to the reflecting surface 21 of the reflecting mirror 20. The light rays reflected to the reflecting surface 21 are corrected by the concave surface 141. The reflecting surface 21 reflects the light rays onto the display 30. Any distortion of the light rays projected on the display 30 is decreased.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light engine, comprising:
    a light source module;
    an optical assembly comprising a light inlet and a light outlet communicating with the light inlet, the light source module connected to the light inlet;
    a collimating lens connected to the light outlet; and
    a reflecting lens comprising a concave surface, the concave surface facing the collimating lens;
    wherein the light source module comprises: three light emitting diodes (LEDs) and an X-prism, the X-prism is a cuboid and comprises four side surfaces, the three LEDs are respectively attached on three of the four side surfaces of the X-prism;

a supporting plate comprising a first plate, a second plate, a connection plate, and a position plate, the first plate being generally parallel with the second plate, the connection plate connecting the first plate and the second plate, the height of the second plate being less than the height of the first plate, the position plate being positioned on the second plate, the optical assembly and the collimating lens being supported on the first plate, the reflecting lens being supported on the second plate, and being fixed by the position plate.

2. The light engine of claim 1, wherein the three LEDs respectively emit red, green, blue lights, the red, green, blue lights emitted from the LEDs are combined by the X-prism.

3. The light engine of claim 1, wherein a focal length of the collimating lens is less than 35 mm.

4. The light engine of claim 1, wherein the collimating lens comprises a rear end and a front end connected to the rear end, the rear end is connected to the light inlet, and the concave surface faces the front end.

5. The light engine of claim 1, wherein the collimating lens comprises a substantially flat top surface.

6. A rear projection television comprising:
a light engine, comprising:
  a light source module;
  an optical assembly comprising a light inlet and a light outlet communicating with the light inlet, the light source module connected to the light inlet;
  a collimating lens connected to the light outlet;
  a reflecting lens comprising a concave surface, the concave surface facing the collimating lens; and
  a supporting plate comprising a first plate, a second plate, a connection plate, and a position plate, the first plate being generally parallel with the second plate, the connection plate connecting the first plate and the second plate, the height of the second plate being less than the height of the first plate, the position plate being positioned on the second plate, the optical assembly and the collimating lens being supported on the first plate, the reflecting lens being supported on the second plate, and being fixed by the position plate;
a reflecting mirror comprising a reflecting surface, the concave surface facing the reflecting surface; and
a display facing the reflecting mirror;
wherein the light source module comprises three light emitting diodes (LEDs) and an X-prism, the X-prism is a cuboid and comprises four side surfaces, the three LEDs are respectively attached on three of the four side surfaces of the X-prism.

7. The rear projection television of claim 6, wherein the three LEDs respectively emit red, green, blue lights, the red, green, blue lights emitted from the LEDs are combined by the X-prism.

8. The rear projection television of claim 6, wherein a focal length of the collimating lens is less than 35 mm.

9. The rear projection television of claim 6, wherein the collimating lens comprises a rear end and a front end connected to the rear end, the rear end is connected to the light inlet, and the concave surface faces the front end.

10. The rear projection television of claim 6, wherein the collimating lens comprises a substantially flat top surface.

* * * * *